April 16, 1940. A. S. VOLPIN 2,197,455
SLUSH PUMP VALVE
Filed June 28, 1937
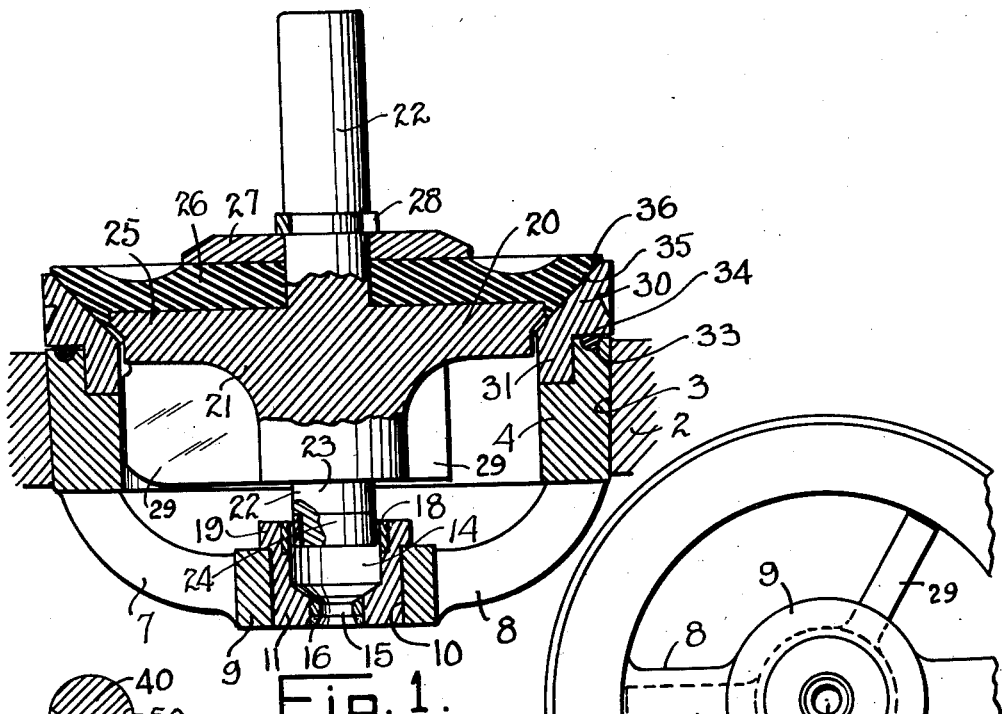
Fig. 1.
Fig. 4.
Fig. 2.
Fig. 3.
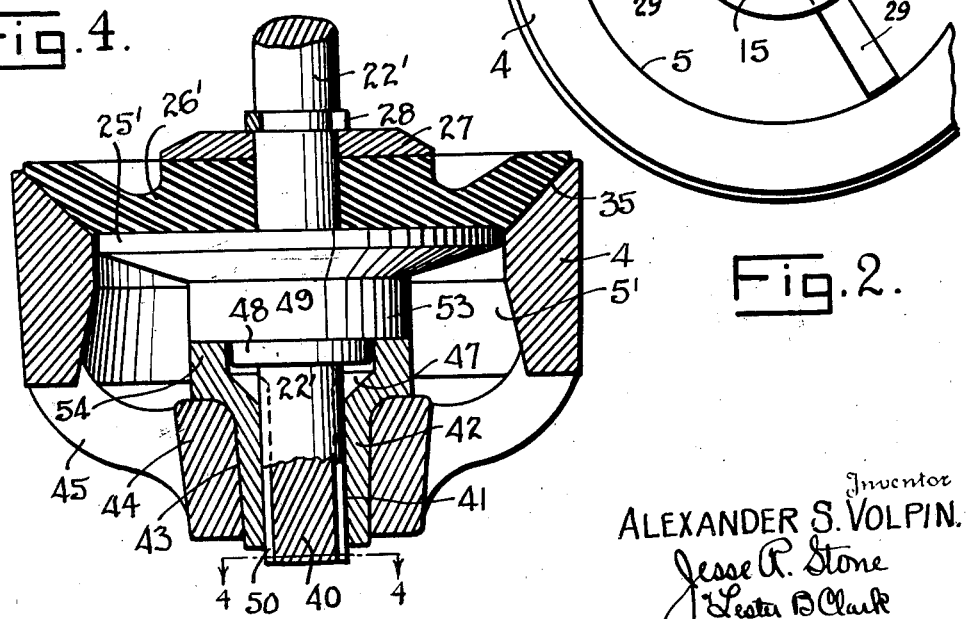
Inventor
ALEXANDER S. VOLPIN.
Jesse R. Stone
Lester B Clark
By
Attorneys.

Patented Apr. 16, 1940

2,197,455

UNITED STATES PATENT OFFICE 2,197,455

SLUSH PUMP VALVE

Alexander S. Volpin, Houston, Tex., assignor to Mission Manufacturing Company, a corporation Application June 28, 1937, Serial No. 150,716

2 Claims. (Cl. 251—128)

The invention relates to a valve which is particularly of use in a slush pump where high pressures are encountered and the shock of closing the valve is material.

In the drilling of deep wells by modern methods it is well known that the slush pumps used frequently operate under extreme pressures as great as one thousand pounds per square inch and with fluid capacities necessitating the use of valves having cross sectional areas as great as forty square inches and operating at a frequency even in excess of one hundred times per minute. It is thus apparent that a force as great as forty thousand pounds may accelerate a valve toward and into seating position at a rate in excess of one hundred times per minute. Such operating conditions cause rapid wear and distortion of elements comprising the valve assembly which must be frequently replaced at considerable cost. The present invention seeks to obviate difficulties arising from these exacting operating conditions by providing means for retarding the velocity of the valve as closure is approached. By means of the invention fluid passing through the valve is used as a medium for absorbing the kinetic energy of the closing valve whereby such energy is transferred into heat and cool fluid is utilized in successive strokes for such absorption. In this manner the excessive pounding resulting in rapid wear and distortion of parts is minimized.

It is one of the objects of the invention to provide a dash pot construction to absorb the shock of closing of a slush pump valve.

Another object of the invention is to provide a combination of a slush pump valve and seat with a restriction for the discharge of a trapped body of liquid so that the discharge of such liquid tends to cushion the closing movement of the valve member to absorb the shock.

Another object of the invention is to provide a slush pump valve having means for absorbing a portion of the kinetic energy of the valve member whereby the shock of closing and the tendency of the valve to recoil from its seat are minimized.

Another object of the invention is to provide a slush pump valve and seat with a bushing in the seat member which cooperates with the valve to cushion the closing movement of the valve member.

Another object of the invention is to provide a renewable seat ring for slush pump valves.

Another and more specific object of the invention is to provide a slush pump valve in which a valve seat insert is sealably engaged with a seat ring by means of a sealing gasket therebetween.

Other and further objects of the invention will be readily apparent when the following description is considered in connection with the accompanying drawing wherein:

Fig. 1 is a vertical sectional view of a valve and seat construction embodying the invention.

Fig. 2 is a bottom plan view of the valve as shown in Fig. 1.

Fig. 3 is a vertical sectional view of a modified form of the invention.

Fig. 4 is a section taken on the line 4—4 of Fig. 3 and looking in the direction of the arrows.

In Fig. 1 the slush pump body is illustrated at 2 and is provided with an opening 3 which receives the valve seat 4. This seat is usually of annular configuration as seen in Fig. 2 and has an opening 5 therethrough and it is through this opening that the flow of liquid will occur during the pumping operation. This seat 4 is vertically wedged in position in the opening 3 so that there will be no leakage around the outside of the seat. The seat is formed with a spider construction, which includes the arms 7 and 8 and the central hub portion 9. As seen in Fig. 1, this hub portion is formed with a central opening 10, which is arranged to receive a bushing 11. This bushing in turn is provided with an internal chamber 14 which is open at its upper end and is restricted at its lower end by a discharge port 15 of smaller area than the area of the chamber. This opening 15 may be lined with a wear resistant material 16, if desired. A ring of wear resistant material 18 may be provided around the upper inside edge of the chamber 14. A flange 19 on the bushing rests upon top of the hub 9 in order to support the bushing.

A valve 20 is arranged for reciprocation relative to the seat and this valve includes the valve body 21 and the stem 22. The stem extends above and below the body 21 and the lower end 23 thereof extends into the chamber 14 when the valve is closed, as best seen in Fig. 1. If desired, a ring of wear resistant material 24 may be provided around the periphery of the end of this valve stem.

The lower end of the stem will fit quite snugly within the chamber 14 and it is intended that this construction will serve as a dash pot to damp the action of the valve as its closes. It seems obvious that as the valve moves upwardly due to the force of liquid surging against it the chamber 14 will be filled with liquid and when the surging action ceases the pressure on top of the valve will tend to close it, moving the stem downwardly into the chamber 14. In view of the fact that the stem 22 is of greater cross sectional area than the port 15 it tends to drive the liquid out of the chamber 14 at a high velocity through the port 15. It seems obvious that this port may be made of any desired size so as to damp the action of the valve as may be found most practical. The wear resistant portions 16, 24 and 18 are placed at the locations where any cutting action due to the flow of the abrasive liquid will occur.

The valve 20 is composed of a lower flange 25, the resilient packing or sealing ring 26, and the cap plate 27. This cap plate may be held in place by a snap ring 28. The valve body 21 is provided with guiding fins or ribs 29 shown in each of Figs. 1 and 2 and these fins serve to guide the valve so that the stem 22 will enter the chamber 14.

The seat 4 is provided with a replaceable seat ring 30, which is formed with a downwardly projecting flange 31 which fits upon a correspondingly stepped portion of the seat. A horizontal face 33 on the upper edge of this valve seat 4 may be recessed in order to receive a sealing gasket 34. This gasket will be positioned between the valve seat and the valve seat ring so as to form a seal therewith and prevent any leakage between these two parts. A seating face 35 is provided on the seat ring 30 to receive the lower beveled face 36 of the sealing ring 26.

While the dash pot construction has been shown as incorporated in the removable bushing 11, it seems obvious that it may be manufactured as an integral part of the hub 9 if desired.

Fig. 3 shows a modified form of the invention where the parts are quite similar to those previously described except that the stem 22' has been elongated to provide a lower end portion 40 thereon. This portion is slidably arranged within the opening 41 in a stop bushing 42, which is in turn deposited in the opening 43 in the hub 44 of the spider 45. This bushing 42 is recessed to provide chamber 47 in the upper end thereof, which is enlarged with regard to the opening 41 and is arranged to receive the head portion 48, which constitutes an enlarged area on the valve body 49. This head 48 fits quite snugly in the chamber 47 and tends to drive any liquid in the chamber downwardly through the opening 41. A plurality of grooves or channels 50 may be provided in the periphery of the stem portion 40 so that the liquid trapped in the chamber 47 can flow downwardly along the valve stem 40 and escape. The friction loss in a channel such as 50 is considerable, however, and due to its restricted area it will retard the escape of liquid and tend to damp the closing action of the valve after the head 48 has entered the chamber 47.

No removable seat ring is shown in Fig. 3 and the flange portion 25' is shown to be of a diameter to fit within the passage 5' in the seat member. It should also be noted that the enlarged body portion 53 on the valve is arranged to abut against the shoulder 54 on the upper end of the bushing 42 so that a positive stop is provided for the valve in addition to the damping action due to the flow of fluid.

Broadly, the invention contemplates a valve and valve seat construction wherein a body of liquid is trapped and allowed to discharge through a restricted orifice in order to absorb the shock of closing of the valve.

What is claimed is:

1. A slush pump valve assembly comprising a seat ring having an annular seating surface thereon, a guide bushing coaxial with and supported by said ring, said bushing having an axial bore therein, said bore being enlarged at its upper end to form a chamber, a valve in said seat ring, a stem thereon extending into the bore in said bushing, and a head on said stem adapted to enter into and snugly fit within said chamber and damp downward movement as the valve approaches closed position, said stem including a body portion adapted to contact the upper surface of the bushing to stop the closing movement of the stem leaving the head in spaced relation with the bottom of the chamber when the valve is in closed position.

2. A slush pump valve assembly comprising a seat ring, a transverse spider on said ring, a bushing having an axial bore mounted in said spider, an enlargement on the upper end of said bushing having a chamber therein, a valve in said ring, a stem on said valve extending into the bore of the bushing and having a head adapted to enter into and snugly fit within said chamber, a body portion on said valve to contact the upper surface of the bushing and serve as a stop when the valve is in closed position and to hold the head in spaced relation with the bottom of the chamber, and ports leading from said chamber to throttle the passage of fluid from the chamber as the valve moves to stop position.

ALEXANDER S. VOLPIN.